United States Patent
Ito et al.

(10) Patent No.: US 7,279,666 B2
(45) Date of Patent: Oct. 9, 2007

(54) VACUUM MICROWAVE THAWING METHOD AND VACUUM MICROWAVE THAWING MACHINE

(75) Inventors: Nobuo Ito, Nishitokyo (JP); Yoshiki Sugiyama, Shizuoka (JP); Takashi Asahara, Shizuoka (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 373 days.

(21) Appl. No.: 10/487,993

(22) PCT Filed: Aug. 23, 2002

(86) PCT No.: PCT/JP02/08489

§ 371 (c)(1), (2), (4) Date: Sep. 21, 2004

(87) PCT Pub. No.: WO03/020055

PCT Pub. Date: Mar. 13, 2003

(65) Prior Publication Data

US 2006/0289529 A1    Dec. 28, 2006

(30) Foreign Application Priority Data

Aug. 28, 2001 (JP) ............................. 2001-258381

(51) Int. Cl.
*H05B 6/64* (2006.01)
*A23L 3/365* (2006.01)
*F24C 7/02* (2006.01)

(52) U.S. Cl. ............... 219/703; 219/686; 426/241; 426/523

(58) Field of Classification Search ........ 219/702–705, 219/707, 709, 686; 426/241, 243, 524; 99/451
See application file for complete search history.

(56) References Cited

FOREIGN PATENT DOCUMENTS

| JP | 4-43593 | 2/1992 |
|---|---|---|
| JP | 6-38724 | 2/1994 |
| JP | 8-327068 | * 12/1996 |
| JP | 2000-308478 | 11/2000 |

* cited by examiner

*Primary Examiner*—Philip H. Leung
(74) *Attorney, Agent, or Firm*—Pillsbury Winthrop Shaw Pittman, LLP

(57) ABSTRACT

A thawing cycle, wherein after reduced-pressure process (G) is carried out to reduced-pressure balanced range (B), pressure restoration process (F) is started, and when the reduced-pressure of pressure restoration process (F) reaches a lower limit (P1) at which vacuum discharge does not occur, irradiation of microwaves is started, and after pressure restoration is carried out to a preset pressure restoration upper limit (D), reduced-pressure process (G') is carried out once again, and irradiation of microwaves continues until the reduced-pressure reaches a lower limit (P1) at which vacuum discharge does not occur, and sublimation cooling by sublimation is carried out in the reduced-pressure process to reduced-pressure balanced range (B') after the irradiation of microwaves is terminated, is carried out repeatedly.

13 Claims, 6 Drawing Sheets

| COURSE | FOODSTUFF TO BE THAWED | HEATING SUBLIMATION CONDITION ||||| THAW TERMINATION CONDITION ||
| | | MICROWAVE HEATING || COOLING UNDER REDUCED PRESSURE || | | |
| | | NORMAL OUTPUT kW/kg | RADIATION TIME sec./one time | CHANGE IN DECOMPRESSION Torr./one cycle | SUBLIMATION TIME sec./one time | VACUUM PRESSURE Torr. | TOTAL HEATING TIME sec. |
|---|---|---|---|---|---|---|---|
| 1 | TUNA BLOCK | 1.5 | 90 | 0.1 | 40 | 3.6 | |
| 2 | TUNA STRIP | 1.5 | 80 | 0.1 | 20 | 3.6 | |
| 3 | BEEF BLOCK | 1.2 | 90 | 0.1 | 40 | 3.6 | |
| 4 | BEEF STEAK | 1.2 | 80 | 0.1 | 20 | 3.6 | |
| 5 | PACKED BEEF STEAK | 1.2 | 80 | | | | 350 |

FIG.6

VACUUM MICROWAVE THAWING METHOD AND VACUUM MICROWAVE THAWING MACHINE

CROSS-REFERENCE TO RELATED APPLICATIONS

This application is the National Phase of International Application No. PCT/JP02/08489 filed Aug. 23, 2002, which designated the U.S. and was published on Mar. 13, 2003 as International Publication No. WO 03/020055 A1, which is based upon and claims the benefit of priority from prior Japanese Patent Application No. 2001-258381 filed Aug. 28, 2001, the entire contents of which are incorporated herein by reference.

TECHNICAL FIELD

The present invention relates to a vacuum microwave thawing method wherein a reduced-pressure process and a pressure restoration process are repeated and microwaves are radiated to heat and thaw foodstuffs to be thawed like frozen foods, and a vacuum microwave thawing machine that puts into effect the thawing method.

BACKGROUND ART

In the prior art, a vacuum microwave thawing machine has been one wherein a reduced-pressure process and a pressure restoration process are repeated, and microwaves are radiated in the reduced-pressure process and thereby foodstuffs to be thawed are heated and thawed. Further, this kind of a conventional vacuum microwave thawing machine is equipped with a chamber for storing foodstuffs to be thawed, a vacuum pump for decompressing the inside of the chamber, recompressing means for the inside of the chamber decompressed by the vacuum pump, and a microwave oscillator for radiating microwaves into the chamber in the reduced-pressure process.

As mentioned above, in the prior art, microwaves are radiated for heating foodstuffs to be thawed only in the reduced-pressure process, as a result, irradiation time of microwaves in one thawing cycle consisting of a reduced-pressure process and a reduced-pressure process had to become short of itself. Therefore, so as to compensate this disadvantage, it has been necessary to start the irradiation of microwaves from a high-pressure range where reduced-pressure is small, or to employ a microwave oscillator that can radiate microwaves of large output, or to radiate microwaves continuously to a low-pressure range where reduced-pressure is large.

While, in the thawing method in a conventional vacuum microwave thawing machine, in the case where irradiation of microwaves is started from a high-pressure range where reduced-pressure is small, pressure restoration time to the pressure restoration upper limit becomes useless, and if reduced-pressure speed changes, irradiation time of microwaves cannot be secured in stable manners, which has been a problem in the prior art.

Further, in the case where a microwave oscillator having large output is employed and thereby the output of microwaves is increased, an edge effect as a phenomenon where microwaves concentrate on the corners of foodstuffs to be thawed is likely to occur, which has been another problem with the prior art.

Further, in the case where microwaves are radiated continuously to a low-pressure range where reduced-pressure is large, a discharge phenomenon owing to Paschen's law occurs in a chamber, and microwaves are not absorbed into foodstuffs to be thawed, which has been still another problem with the prior art.

The present invention has been made in consideration of the problems in the prior art, accordingly, an object of the present invention is to provide a vacuum microwave thawing method and a vacuum microwave thawing machine that enables to eliminate the need to set the pressure restoration upper limit to a high-pressure range where reduced-pressure is smaller than required, and to prevent the edge effects the phenomenon of microwave concentration, and the discharge phenomenon owing to microwave irradiation.

DISCLOSURE OF THE INVENTION

Accordingly, the present invention is for achieving the object, and a first preferred embodiment of the present invention might be embodied as a vacuum microwave thawing method wherein a reduced-pressure process and a pressure restoration process are repeated and microwaves are radiated to heat and thaw foodstuffs to be thawed like frozen foods.

The vacuum microwave thawing method is characterized by that a series of steps wherein after the reduced-pressure process is carried out to a reduced-pressure balanced range, the pressure restoration process is started, and after the reduced-pressure of the pressure restoration process reaches a lower limit at which vacuum discharge does not occur, irradiation of microwaves is started, and after pressure restoration is carried out to a preset pressure restoration upper limit, the reduced-pressure process is carried out once again, and irradiation of microwaves continues until the reduced-pressure reaches the lower limit at which vacuum discharge does not occur, and sublimation cooling by sublimation is carried out in the reduced-pressure process to the reduced-pressure balanced range after the irradiation of microwaves is terminated, is assigned to a thawing cycle, and the thawing cycle is carried out repeatedly.

According to the first preferred embodiment of the present invention, because after the reduced-pressure process is carried out to a reduced-pressure balanced range, the pressure restoration process is started, and after the reduced-pressure of the pressure restoration process reaches a lower limit at which vacuum discharge does not occur, irradiation of microwaves is started, and after pressure restoration is carried out to a preset pressure restoration upper limit, the reduced-pressure process is carried out once again, and irradiation of microwaves continues until the reduced-pressure reaches the lower limit at which vacuum discharge does not occur, as a consequence, microwaves are radiated in the pressure restoration process and the reduced-pressure process, it is possible to secure sufficient irradiation time in one thawing cycle. Further, because irradiation time can be obtained sufficiently, it is possible to make the output of microwaves small to the mass of foodstuffs to be thawed, as a result, there will be not any edge effect as the phenomenon where microwaves concentrate to corners of foodstuffs to be thawed. Further, because irradiation of microwaves is carried out before the pressure restoration upper limit is reached, it is possible to increase heating in a status wherein foodstuffs become less dry than conventionally, thereby it is possible to prevent foodstuffs to be thawed from becoming dry more efficiently than conventionally.

Further, because irradiation of microwaves is started after the reduced-pressure of the pressure restoration process reaches a lower limit at which vacuum discharge does not occur, it is possible to prevent damage on the internal wall of the chamber owing to vacuum discharge.

Further, because sublimation cooling is carried out in the reduced-pressure process to the reduced-pressure balanced range after the irradiation of microwaves is terminated, the temperatures of foodstuffs to be thawed are made uniform, and the temperatures of foodstuffs to be thawed increase as a whole, and thawing is facilitated, accordingly it is possible to prevent drip owing to partial thawing progress, or concentration of microwaves to drip.

Further, a second preferred embodiment of the present invention may be embodied as a vacuum microwave thawing method according to the first preferred embodiment, wherein the reduced-pressure of the reduced-pressure balanced range gradually increases as the thawing cycle is repeated, and when the reduced-pressure reaches a specified value, the thawing cycle is terminated.

According to the second preferred embodiment of the present invention, because the reduced-pressure of the reduced-pressure balanced range gradually increases as the thawing cycle is repeated, and when the reduced-pressure reaches a specified value, the thawing cycle is terminated, it is possible to grasp a desired thawing temperature with the reduced-pressure of the reduced-pressure balanced range as an index. Accordingly, it is unnecessary to arrange a temperature sensor to the chamber and thereby measure the temperature of foodstuffs to be thawed, so that, it is possible to simplify a machine.

While, a third preferred embodiment of the present invention might be embodied as a vacuum microwave thawing method according to the first or second preferred embodiment, wherein the lower limit of the reduced-pressure at which the vacuum discharge does not occur is 1.33 kPa (10 Torr).

According to the third preferred embodiment of the present invention, because the lower limit of the reduced-pressure at which the vacuum discharge does not occur is 1.33 kPa (10 Torr), a discharge phenomenon is unlikely to occur in the chamber, microwaves are absorbed sufficiently into foodstuffs to be thawed, therefore, it is possible to make showing time short, and to realize stable thawing operation.

Further, a fourth preferred embodiment of the present invention may be embodied as a vacuum microwave thawing method according to the first through third preferred embodiment, wherein the pressure restoration upper limit is set by the output of a microwave oscillator for radiating microwaves and the reduced-pressure capacity of a vacuum pump.

According to the fourth preferred embodiment of the present invention, because the pressure restoration upper limit is set by the output of a microwave oscillator for radiating microwaves and the reduced-pressure capacity of a vacuum pump, it is possible to efficiently set irradiation time of microwaves in the reduced-pressure process, and to carry out reduced-pressure in efficient manners.

While, a fifth preferred embodiment of the present invention might be embodied as a vacuum microwave thawing method according to the first through fourth preferred embodiment, wherein pressure restoration characteristics in the pressure restoration process are constant in each thawing cycle.

According to the fifth preferred embodiment of the present invention, because pressure restoration characteristics in the pressure restoration process are constant in each thawing cycle, it is possible to carry out stable thawing.

Further, a sixth preferred embodiment of the present invention may be embodied as a vacuum microwave thawing method according to the first through fifth preferred embodiment, wherein an appropriate output of a microwave oscillator, microwave irradiation time per thawing cycle, and sublimation time are prerecorded into a controller as several courses according to categories and shapes of foodstuffs to be thawed, and the courses are selectable in thawing, and according to the thawing conditions of a selected course, the controller controls the thawing cycle and carried out thawing.

According to the sixth preferred embodiment of the present invention, because an appropriate output of a microwave oscillator, microwave irradiation time per thawing cycle, and sublimation time are prerecorded into the controller as several courses according to categories and shapes of foodstuffs to be thawed, and the courses are selectable in thawing, and according to the thawing conditions of a selected course, the controller controls the thawing cycle and carried out thawing, even with different categories and shapes of foodstuffs to be thawed, thawing may be carried out by simple operation. For example, it is possible to solve the inconvenience to carry out entry operation for different categories and shape.

Further, a seventh preferred embodiment of the present invention may be embodied as a vacuum microwave thawing machine comprising a chamber for storing foodstuffs to be thawed, a vacuum pump for decompressing the inside of the chamber, a regulation valve for recompressing the inside of the chamber, a microwave oscillator for radiating microwaves into the chamber, and a controller to which control systems of the vacuum pump, regulation valve and microwave oscillator are connected, wherein a reduced-pressure process and a pressure restoration process are repeated and microwaves are radiated to heat and thaw foodstuffs to be thawed like frozen foods.

The vacuum microwave thawing method is characterized by that a series of steps wherein after the reduced-pressure process is carried out to a reduced-pressure balanced range, the pressure restoration process is started, and after the reduced-pressure of the pressure restoration process reaches a lower limit at which vacuum discharge does not occur, irradiation of microwaves is started, and after pressure restoration is carried out to a preset pressure restoration upper limit, the reduced-pressure process is carried out once again, and irradiation of microwaves continues until the reduced-pressure reaches the lower limit at which vacuum discharge does not occur, and sublimation cooling by sublimation is carried out in the reduced-pressure process to the reduced-pressure balanced range after the irradiation of microwaves is terminated, is assigned to a thawing cycle, and the thawing cycle is carried out repeatedly.

According to the seventh preferred embodiment of the present invention, because after the reduced-pressure process is carried out to a reduced-pressure balanced range, the pressure restoration process is started, and after the reduced-pressure of the pressure restoration process reaches a lower limit at which vacuum discharge does not occur, irradiation of microwaves is started, and after pressure restoration is carried out to a preset pressure restoration upper limit, the reduced-pressure process is carried out once again, and irradiation of microwaves continues until the reduced-pressure reaches the lower limit at which vacuum discharge does not occur, as a consequence, microwaves are radiated in the pressure restoration process and the reduced-pressure process, it is possible to secure sufficient irradiation time in one thawing cycle, and it is possible to shorten the whole thawing time and thereby to carry out efficient thawing. Further, because irradiation time can be obtained sufficiently, it is possible to make the output of microwaves small to the mass of foodstuffs to be thawed, as a result, there will be not any edge effect as the phenomenon where microwaves concentrate to corners of foodstuffs to be thawed. Further, because irradiation of microwaves is carried out before the pressure restoration upper limit is reached, it is possible to increase heating in a status wherein foodstuffs become less dry than conventionally, thereby it is possible to prevent foodstuffs to be thawed from becoming dry more efficiently than conventionally.

Further, because irradiation of microwaves is started after the reduced-pressure of the pressure restoration process reaches a lower limit at which vacuum discharge does not occur, it is possible to prevent damage on the internal wall of the chamber owing to vacuum discharge.

Further, because sublimation cooling is carried out in the reduced-pressure process to the reduced-pressure balanced range after the irradiation of microwaves is terminated, the temperatures of foodstuffs to be thawed are made uniform, and the temperatures of foodstuffs to be thawed increase as a whole, and thawing is facilitated, accordingly it is possible to prevent drip owing to partial thawing progress, or concentration of microwaves to drip.

Further, an eighth preferred embodiment of the present invention may be embodied as a vacuum microwave thawing machine according to the seventh preferred embodiment, wherein the reduced-pressure of the reduced-pressure balanced range gradually increases as the thawing cycle is repeated, and when the reduced-pressure reaches a specified value, the thawing cycle is terminated.

According to the eighth preferred embodiment of the present invention, because the reduced-pressure of the reduced-pressure balanced range gradually increases as the thawing cycle is repeated, and when the reduced-pressure reaches a specified value, the thawing cycle is terminated, it is possible to grasp a desired thawing temperature with the reduced-pressure of the reduced-pressure balanced range as an index. Accordingly, it is unnecessary to arrange a temperature sensor to the chamber and thereby measure the temperature of foodstuffs to be thawed, so that, it is possible to simplify a machine.

Further, a ninth preferred embodiment of the present invention may be embodied as a vacuum microwave thawing machine according to the seventh or eighth preferred embodiment, wherein the lower limit of the reduced-pressure at which the vacuum discharge does not occur is 1.33 kPa (10 Torr).

According to the ninth preferred embodiment of the present invention, because the lower limit of the reduced-pressure at which the vacuum discharge does not occur is 1.33 kPa (10 Torr), a discharge phenomenon is unlikely to occur in the chamber, microwaves are absorbed sufficiently into foodstuffs to be thawed, therefore, it is possible to make showing time short, and to realize stable thawing operation.

While, a tenth preferred embodiment of the present invention might be embodied as a vacuum microwave thawing machine according to the seventh through ninth preferred embodiment, wherein the pressure restoration upper limit is set by the output of a microwave oscillator for radiating microwaves and the reduced-pressure capacity of a vacuum pump.

According to the tenth preferred embodiment of the present invention, because the pressure restoration upper limit is set by the output of a microwave oscillator for radiating microwaves and the reduced-pressure capacity of a vacuum pump, it is possible to efficiently set irradiation time of microwaves in the reduced-pressure process, and to carry out reduced-pressure in efficient manners.

While, an eleventh preferred embodiment of the present invention may be embodied as a vacuum microwave thawing machine according to the seventh through tenth preferred embodiment, wherein pressure restoration characteristics in the pressure restoration process are constant in each thawing cycle.

According to the eleventh preferred embodiment of the present invention, because pressure restoration characteristics in the pressure restoration process are constant in each thawing cycle, it is possible to carry out stable thawing.

Further, a twelfth preferred embodiment of the present invention may be embodied as a vacuum microwave thawing machine according to the seventh through eleventh preferred embodiment, wherein a discharge sensor for detecting occurrence of discharge in the chamber is arranged, and the discharge sensor is connected to the controller. According to the discharge detection signal from the discharge sensor, the controller forcibly terminates the actions of the microwave oscillator.

According to the twelfth preferred embodiment of the present invention, in the case of occurrence of discharge, it is possible to forcibly terminate the microwave oscillator. Therefore, it is possible to prevent the chamber or the similar from being damaged owing to discharge.

Further, a thirteenth preferred embodiment of the present invention may be embodied as a vacuum microwave thawing machine according to the seventh through twelfth preferred embodiment, wherein the controller is equipped with memory means for storing in advance an appropriate output of a microwave oscillator, microwave irradiation time per thawing cycle, and sublimation time as several courses according to categories and shapes of foodstuffs to be thawed, and a course selection portion for selecting the courses is arranged, and according to the thawing conditions of a course selected by the operation at the course selection portion, the controller controls the thawing cycle and carried out thawing.

According to the thirteenth preferred embodiment of the present invention, because an appropriate output of a microwave oscillator, microwave irradiation time per thawing cycle, and sublimation time are prerecorded into the controller as several courses according to categories and shapes of foodstuffs to be thawed, and the courses are selectable in thawing, and according to the thawing conditions of a selected course, the controller controls the thawing cycle and carried out thawing, even with different categories or shapes of foodstuffs to be thawed, thawing may be carried out by simple operation. For example, it is possible to solve the inconvenience to carry out entry operation for different categories or shapes.

BEST MODE FOR IMPLEMENTING THE INVENTION

Figure 1:
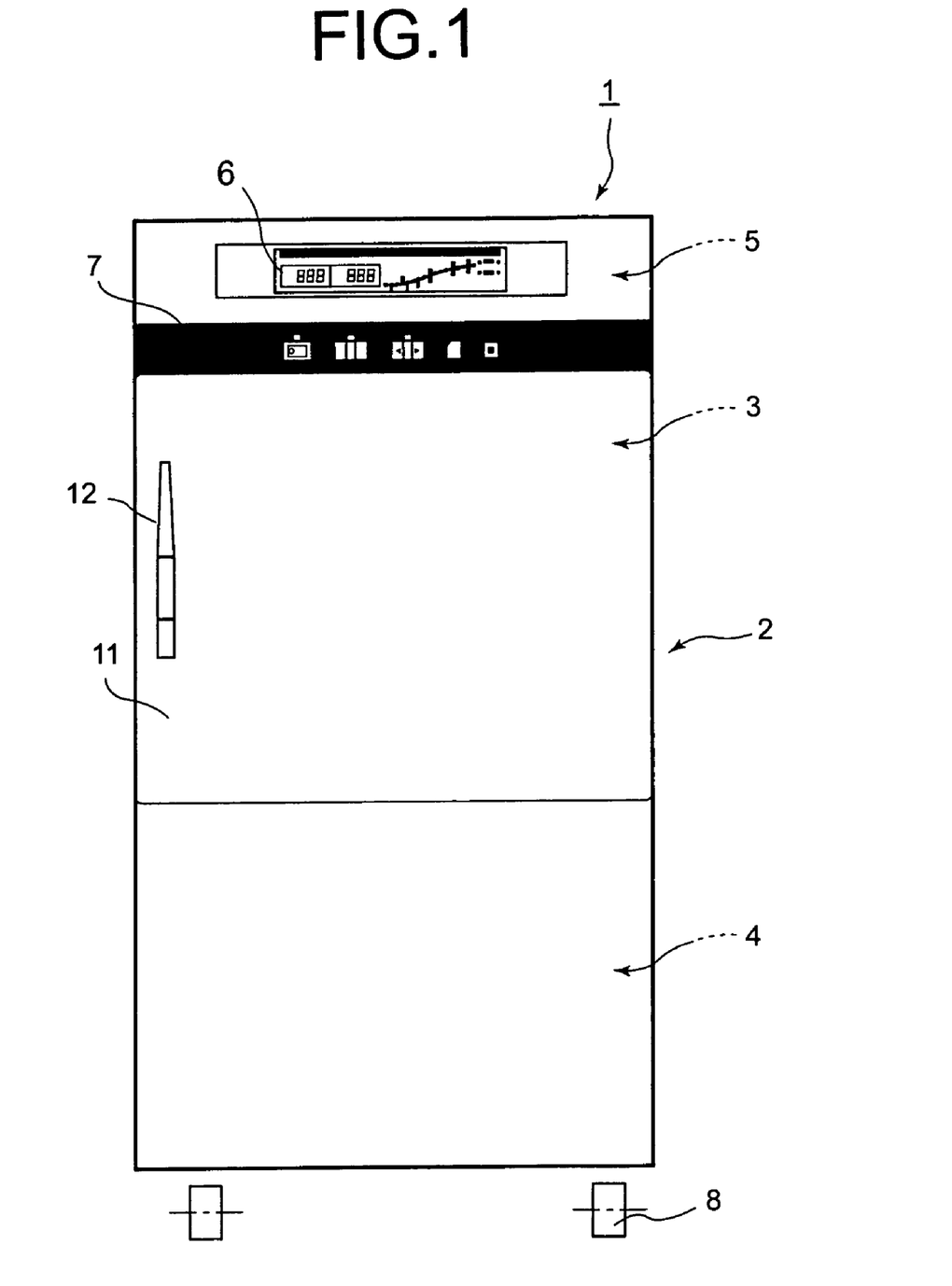
FIG. 1 is a front view showing the external appearance of a vacuum microwave thawing machine according to the preferred embodiment.

The invention is illustrated in more details by reference to the following referential examples and preferred embodiments wherein. FIG. 1 is a front view showing the external appearance of a vacuum microwave thawing machine according to the preferred embodiment. While, FIG. 2 is a schematic diagram showing principal components of a vacuum microwave thawing machine according to the preferred embodiment.

As shown in FIG. 1, a housing 2 of a vacuum microwave thawing machine 1 according to the preferred embodiment is constituted as an upright machine, wherein a food storage 3 for storing foodstuffs to be thawed like frozen foodstuffs etc is arranged at the upper portion thereof, while a machine room 4 for containing a drive motor, a vacuum pump and so forth to be described later herein is arranged at the lower portion thereof, and a control portion 5 for containing a controller is arranged at the top thereof, and to the front panel of this control portion 5, arranged are a display 6 for displaying the weight of foodstuffs to be thawed and thawing time and the like, and a control panel 7 for turning on/off the machine and entering various preset values and the like. Further, casters 8 for easy movement of the vacuum microwave thawing machine 1 are arranged onto the bottom surface of the housing 2 of the vacuum microwave thawing machine 1.

Figure 2:
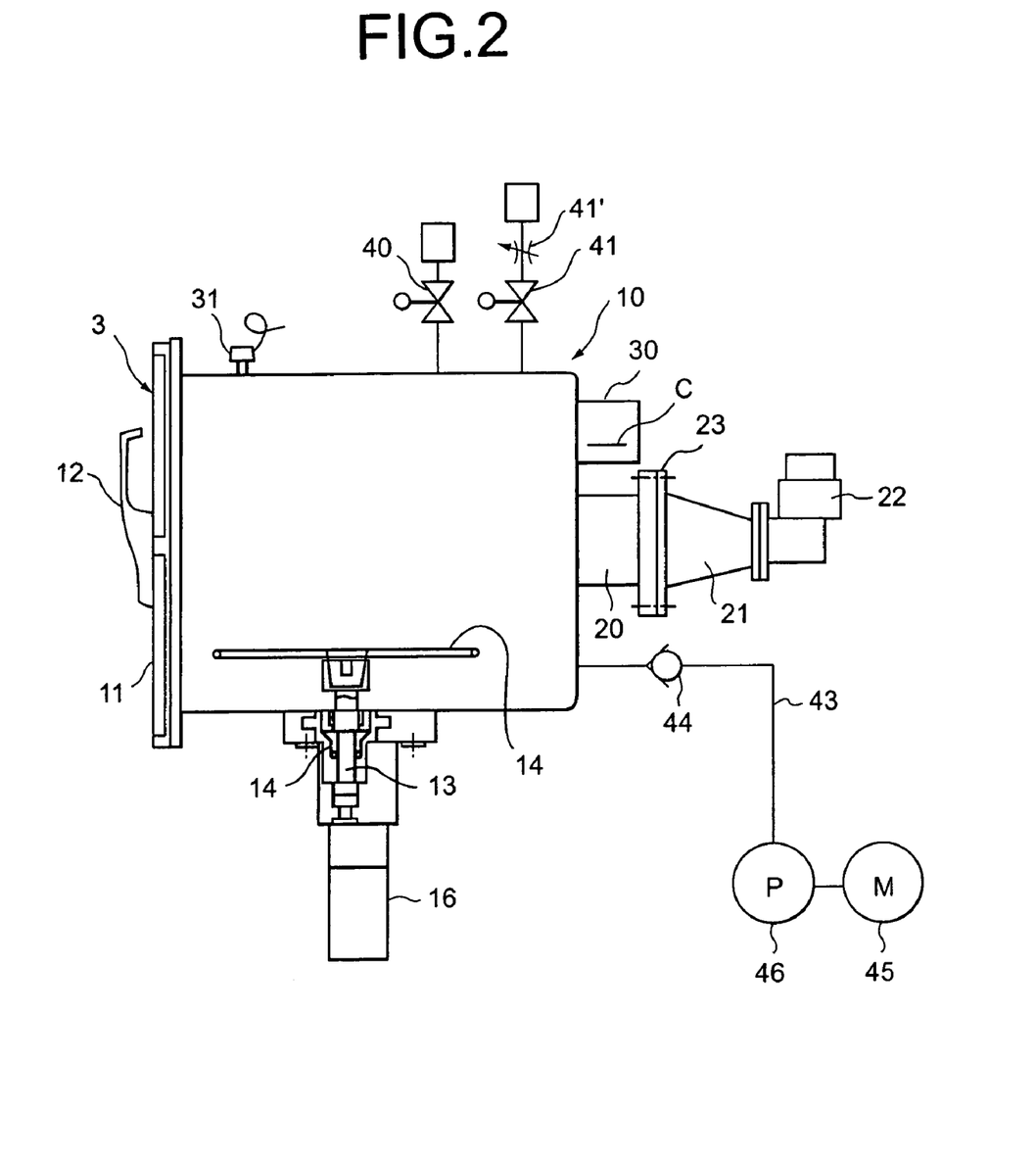
FIG. 2 is a schematic diagram showing principal components of a vacuum microwave thawing machine according to the preferred embodiment.

As shown in FIGS. 1 and 2, the main body of the food storage 3 in the vacuum microwave thawing machine 1 of the preferred embodiment is constituted by a hallow box shaped chamber 10 having a opening portion at the front surface thereof, and the chamber 10 is formed as a pressure resistant airtight container having an internal wall that blocks electromagnetic waves. To the front opening portion of the chamber 10, a door 11 that can close the chamber inside in airtight status is attached so as to freely open and close with, for example, its front right end portion as a hinged portion, and to the front left side to be the opening side of the door 11, a handle 12 to be gripped when to open and close the door is attached, while to the rear side of the door 11, attached are a electromagnetic seal made of a metallic mesh for preventing electromagnetic waves from leaking out and an airtight seal for maintaining airtightness.

To the bottom of the chamber 10, a rotating shaft 13 is arranged upright supported by a bearing 14 so as to rotate, and to the upper end portion of the rotating shaft 13 facing toward the chamber inside, a turntable 15 that rotates with foodstuffs to be thawed thereon together with the rotating shaft 13 is attached, and to the base end portion of the rotating shaft 13, a table drive motor 16 is connected via a decelerating mechanism not illustrated herein.

To the middle of the rear surface of the chamber 10, via a straight waveguide 20 connecting to the chamber inside and a reducer waveguide 21, connected is a microwave oscillator 22 for radiating microwaves to the chamber inside and thereby heating foodstuffs to be thawed put on the turntable 15. In the preferred embodiment, a magnetron is employed as the microwave oscillator 22, and a pressure bulkhead made of a glass plate that easily let microwaves go through is arranged at a flange-coupling portion 23 between the straight waveguide 20 and the reducer waveguide 21.

To the rear surface of the chamber 10, arranged is a discharge sensor 30 that detects discharge in the case discharge occurs in the chamber inside owing to irradiation of microwaves, and as the discharge sensor 30, an UV ray (ultraviolet ray) sensor is employed that judges presence or absence of discharge phenomenon by detection of ultraviolet (UV) ray. Further, on the top of the chamber 10, arranged is a vacuum sensor 31 that detects the pressure of the chamber inside.

On the top of the chamber 10, arranged are an atmospheric release valve 40 that releases the pressure of the chamber inside to the atmosphere, and a pressure regulation valve 41 that regulates the pressure of the chamber inside, while to the rear surface of the chamber 10, connected is a reduced-pressure system 43 that decompresses the inside thereof, and a vacuum pump 46 that is driven by a pump drive motor 45 is connected via a check valve 44 to the reduced-pressure system 43, and these pump drive motor 45 and vacuum pump 46 are contained in the machine room 4.

The atmospheric release valve 40 and the pressure-regulation valve 41 are constituted by, for example, electromagnetic valves, so that they can be opened and closed by a controller contained in the control portion 5. By the way, the pressure-regulation valve 41 may be arranged in the course of the reduced-pressure system 43, for instance, between the chamber 10 and the check valve 44, and may be constituted so that oxygen should easily go into the chamber 10 in reduced-pressure process.

Figure 3:
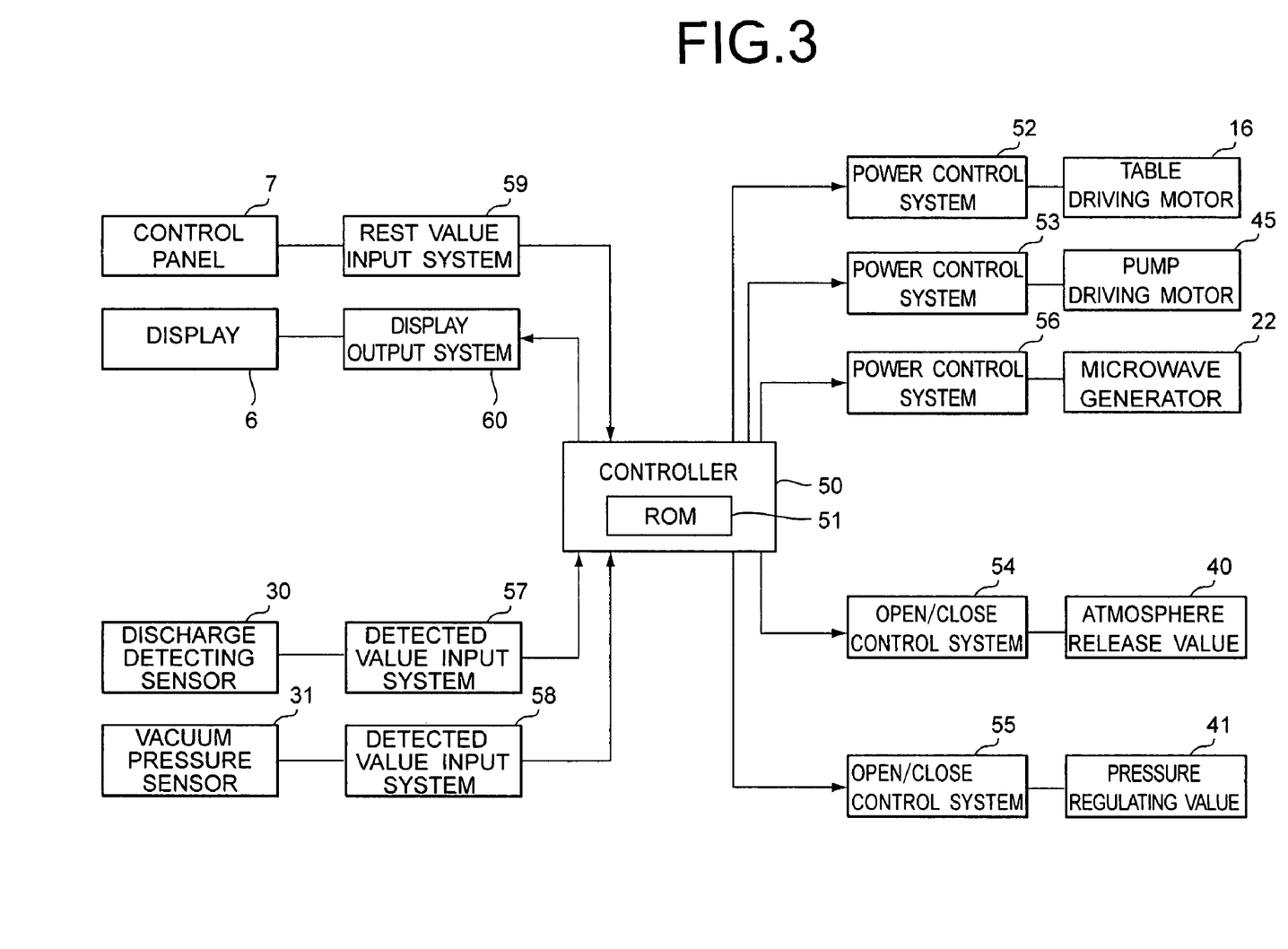
FIG. 3 is a block diagram showing a control system of a vacuum microwave thawing machine according to the preferred embodiment.

FIG. 3 is a block diagram showing a control system of a vacuum microwave thawing machine according to the preferred embodiment. As shown in FIG. 3, the controller 50 contained in the control portion 5 is constituted, for example, by a micro computer or the similar that runs a control program recorded in an ROM 51, and to the controller 50, connected are a power control system 52 of the table drive motor 16 that rotates the turntable 15, a power control system 53 of the pump drive motor 45 that drives the vacuum pump 46, an open-close control system 54 of the atmospheric release valve 40, an open-close control system 55 of the pressure regulation valve 41, a power control system 56 of the microwave oscillator 22, a sensed value feeding system 57 of the discharge sensor 30, a sensed value feed system 58 of the vacuum sensor 31, a preset value entry system 59 of preset value and so forth of the control panel 7, and a display information output system 60 of the display 6, and the controller 50 drives and controls respective devices including the pump drive motor 45 and the microwave oscillator 22 and so forth. According to the preset value on the control panel 7, and detected values and so forth of the discharge sensor 30 and the vacuum sensor 31, according to the control program recorded in the ROM 51.

Figure 4:
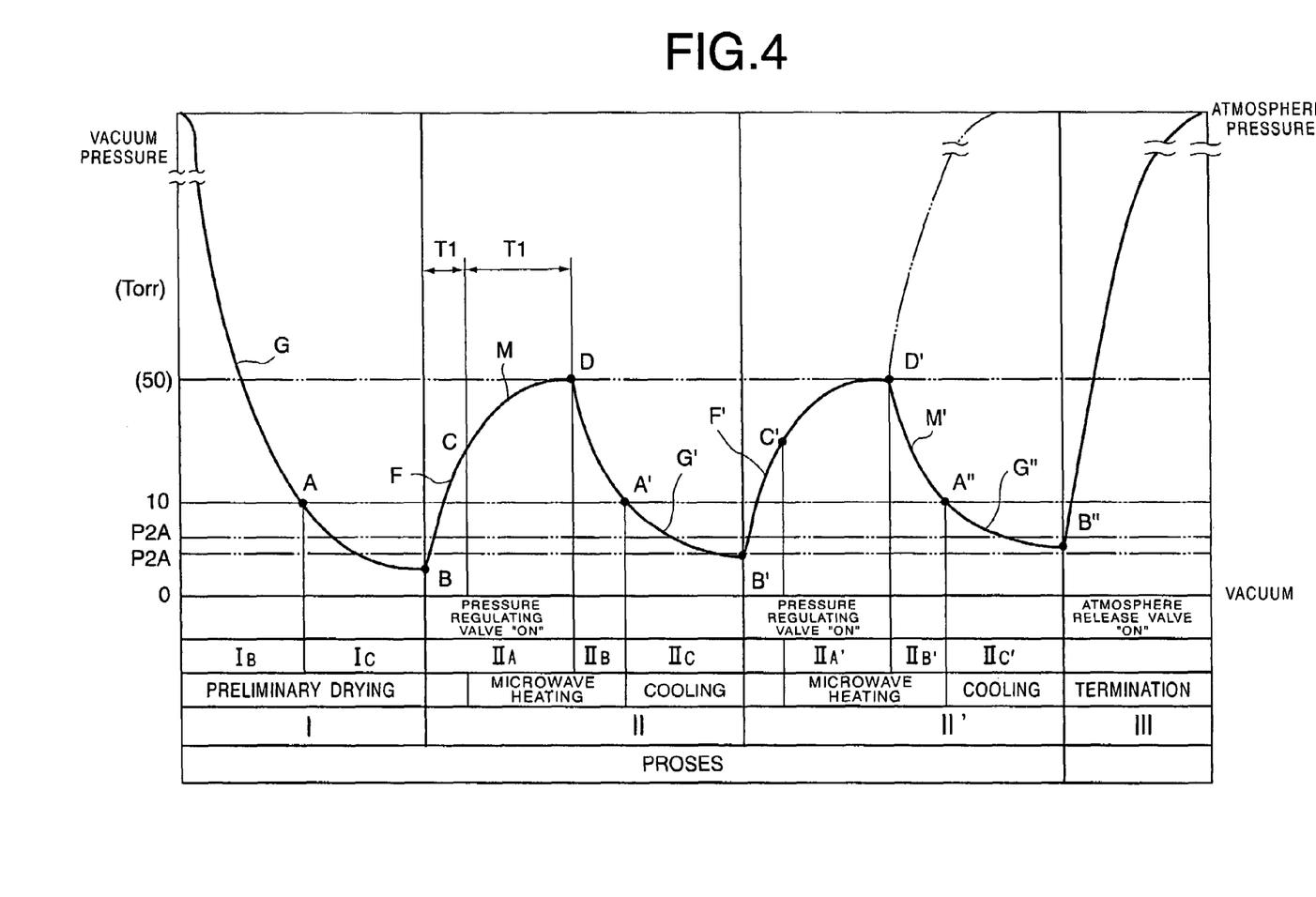
FIG. 4 is an explanatory diagram showing a thawing cycle in a vacuum microwave thawing machine according to the preferred embodiment.

In the next place, a vacuum microwave thawing method according to the preferred embodiment employing the vacuum microwave thawing machine 1 is explained hereinafter. FIG. 4 is an explanatory diagram showing a thawing cycle in a vacuum microwave thawing machine according to the preferred embodiment.

As shown in FIG. 4, the vacuum microwave thawing machine 1 of the preferred embodiment is a machine that repeat reduced-pressure processes G, G', G", . . . and pressure restoration processes F, F', . . . and radiates microwaves M, M', . . . and thereby heats and thaws foodstuffs to be thawed. By the way, the vacuum pump 46 continues working in pressure restoration processes as well as reduced-pressure processes.

As a thawing preparation stage, first, the door 11 at the front surface is opened, and foodstuffs to be thawed of frozen foodstuffs and the like are put on the turntable 15, then the door 11 is closed airtight, and foodstuffs to be thawed are contained in the chamber 10. By the way, the atmospheric release valve 40 and the pressure-regulation valve 41 are closed.

Then, the pump drive motor 45 is driven and the vacuum pump 46 is operated, and reduced-pressure of the inside of the chamber 10 is started via the reduced-pressure system 43. At this moment, the reduced-pressure gradually decreases from the atmospheric pressure 101.3 kPa (760 Torr) and via the state A, and reduced-pressure process G is carried out to the reduced-pressure balanced state B, and in the reduced-pressure process G, preliminary drying of foodstuffs to be thawed is carried out.

Herein, the reduced-pressure balanced range means an area wherein reduced-pressure to specific time extremely decreases, and it is grasped that reduced-pressure balanced range is reached when the reduced-pressure ($\Delta P$) at for example 30 seconds ($\Delta t$) becomes $\Delta P/\Delta t < 13.3$ Pa (0.1 Torr), while the balanced pressure at the reduced-pressure balanced range fluctuates with saturated steam pressure in the chamber. By the way, whether the reduced-pressure balanced range is reached or not is judged by calculation that the controller carries out according to the pressure signals from the vacuum sensor 31.

Further, in the preferred embodiment, at the start of thawing cycle to be described later herein, preliminary drying is carried out, therefore, even if there is thawed water on the surface of foodstuffs to be thawed, water can be removed in preliminary drying before thawing, and even if microwaves are radiated, it is possible to prevent the irradiation thereof from concentrating.

After reduced-pressure process G is carried out to the reduced-pressure balanced state B, the pressure regulation valve 41 is opened with a predetermined opening to be described later herein, and the process progresses to pressure restoration process F, and at the state C after the lower limit P1 at which reduced-pressure of pressure restoration process F does not cause vacuum discharge (which, in the preferred embodiment, is set to 1.33 kPa (10 Torr) with a bit allowance), the microwave irradiation M by the magnetron 22 is started, and when pressure restoration is carried out to reach the preset pressure restoration upper limit D, the controller closes the pressure regulation valve 41 according to the pressure signals from the vacuum sensor, thereafter the process progresses to reduced-pressure process G' once again. Further, until the state A' before the reduced-pressure reaches the lower limit P1 at which the reduced-pressure does not cause vacuum discharge, the microwave irradiation M by the magnetron 22 continues and foodstuffs to be thawed are heated, and at the state A', irradiation of microwaves is terminated.

In the preferred embodiment, at the state C at which it is supposed that the reduced-pressure of pressure restoration process F has exceeded the lower limit P1 at which the reduced-pressure of pressure restoration process F does not cause vacuum discharge after lapse of time T1 (preset time, for example, 10 seconds) from the reduced-pressure balanced state B, the microwave irradiation M by the magnetron 22 is started, however, the scope of the present invention is not limited to the embodiment, and it may be detected from pressure signals from the vacuum sensor 31 that the reduced-pressure of pressure restoration process F has reached the lower limit P1 at which the reduced-pressure of pressure restoration process F does not cause vacuum discharge. Based on the detection, the microwave irradiation M may be started.

Further, in the preferred embodiment, the lower limit P1 of reduced-pressure at which vacuum discharge does not occur is, as mentioned above, set to 1.33 kPa (10 Torr). Namely, at the state C after reduced-pressure in pressure restoration process F exceeds 1.33 kPa (19 Torr), the microwave irradiation M is started, and pressure restoration is carried out to the preset pressure restoration upper limit D, then the process progresses to reduced-pressure process G' once again, and until the state A' before the reduced-pressure reaches 1.33 kPa (10 Torr), the microwave irradiation M continues and thereby foodstuffs to be thawed are heated. Because the microwave irradiation M is carried out from the halfway in pressure restoration process F through reduced-pressure process G' as mentioned above, in comparison with the prior art wherein irradiation is carried out only in reduced-pressure process, it is possible to secure sufficient irradiation time in one thawing cycle consisting of pressure restoration process and reduced-pressure process. Consequently, it is possible to make the output of microwaves to the mass of foodstuffs to be thawed small, as a result, there will no edge effect as the phenomenon of concentration of microwaves to corners of foodstuffs to be thawed.

Further, because the microwave irradiation M is started at the time C after reduced-pressure in pressure restoration process F exceeds 1.33 kPa (10 Torr), the vaporization amount of water from the surface of foodstuffs to be thawed is small, there is no drying and reduced-pressure speed will not become slow at the same time, as a result, it is possible to carry out preferable thawing in stable manners. Further, because the microwave irradiation M is carried out in the range of reduced-pressure over 1.33 kPa (10 Torr), discharge phenomenon is unlikely to occur in the chamber 10, and microwaves are sufficiently absorbed into foodstuffs to be thawed, therefore, it is possible to shorten thawing time, and realize stable thawing.

The pressure restoration upper limit D is a variable pressure value to be set according to the output of the magnetron 22 to radiate microwaves, the reduced-pressure capacity of the vacuum pump 46, and the volume of the chamber 10, and in the preferred embodiment, the value is set to 6.66 kPa (50 Torr) by regulating the throttle of the throttle valve 41' of the pressure regulation valve 41. Therefore, when pressure restoration is carried out to 6.66 kPa (50 Torr), the leakage from the pressure regulation valve 41 and the suction capacity of the vacuum pump 46 are in balance, and the pressure will be maintained at 6.66 kPa (50 Torr) and will not increase unless the pressure regulation valve 41 is closed.

In the preferred embodiment, because the pressure value of pressure restoration upper limit D is appropriately set according to the output of the magnetron 22 to radiate microwaves, the reduced-pressure capacity of the vacuum pump 46, and the volume of the chamber 10 as mentioned above, it is possible to take appropriate irradiation time of microwaves before entering into the vacuum discharge occurring range, and to carry out reduced-pressure in efficient manners.

By the way, as means for detecting that the pressure restoration upper limit D has been reached, in the preferred embodiment, detection is carried out by signals from the vacuum sensor 31, thereby the controller closes the pressure regulation valve 43 and the process progresses to reduced-pressure process, however, the scope of the present invention is not limited to the embodiment, but for example, control may be made by time T2 from the time C where irradiation of microwaves is started (to be experimentally obtained from the capacity of the vacuum pump and the volume of the chamber, in the same manner as for T1). In concrete, time T2 from C may be set 80 seconds, and the pressure regulation valve 43 may be closed at the moment when the time 80 seconds is up, and the process may progress to reduced-pressure process.

After the termination of microwave irradiation, in reduced-pressure process from the state A' to the reduced-pressure balanced state B', foodstuffs to be thawed are sublimated and cooled. In this manner, microwaves are radiated to the state A' in the reduced-pressure process G' to heat foodstuffs to be thawed, and thereafter foodstuffs to be thawed are sublimated and cooled in the reduced-pressure process from the state A' to the reduced-pressure balanced state B', because when microwaves are radiated and foodstuffs to be thawed are heated, the temperature of the surface of foodstuffs to be thawed becomes higher than the temperature of the center thereof, and if heating continues as it is, inconvenient conditions such as drip on surface or so will occur, therefore, the surface is cooled by sublimation and temperature difference between the surface and the inside is reduced.

Namely, when sublimation starts, vaporization latent heat is removed and the temperature of the surface portion goes down, and the heat of the surface portion moves (thermally transmits) into the middle and the middle is heated. Thereby, the temperatures of foodstuffs to be thawed are made even, and the temperatures of foodstuffs to be thawed increase as a whole, and thawing is facilitated. Further, because the temperature of foodstuffs to be thawed are made uniform, and thawing of foodstuffs to be thawed is facilitated, it is possible to prevent inconvenient conditions such as thawing progressing partially and drip occurring, or microwaves concentrating and so on.

In the preferred embodiment, the process progresses to the pressure restoration process F, and at the state C after the reduced-pressure of the pressure restoration process F exceeds 1.33 kPa (10 Torr) as the lower limit P1 at which vacuum discharge does not occur, the microwave irradiation M is started, and after pressure restoration is carried out to 6.66 kPa (50 Torr) as the preset pressure restoration upper limit D, the process progresses to the reduced-pressure process G' once again, and until the reduced-pressure reaches 1.33 kPa (10 Torr) of A' as the lower limit P1 at which vacuum discharge does not occur, the microwave irradiation M continues for heating, and after the microwave irradiation M is terminated, and sublimation cooling is carried out in reduced-pressure process to the reduced-pressure balanced state B', which is carried out a thawing cycle, and the thawing cycle is carried out repeatedly.

Namely, in FIG. 4, after the reduced-pressure process G' is carried out to the reduced-pressure balanced process B', the process progresses to the pressure restoration process F', and at the state C' after the reduced-pressure of the pressure restoration process F' exceeds 1.33 kPa (10 Torr) as the lower limit P1 at which vacuum discharge does not occur, irradiation M' of microwaves is started once again, and pressure restoration is carried out to 6.66 kPa (50 Torr) as the preset pressure restoration upper limit D', thereafter the process progresses to the reduced-pressure process G" once again, and irradiation M' of microwaves continues and heating is carried out until the reduced-pressure reaches 1.33 kPa (10 Torr) of A" as the lower limit P1 at which vacuum discharge does not occur, and the microwave irradiation is terminated once again, thereafter thawing cycle to carry out sublimation cooling in reduced-pressure process to the reduced-pressure balanced state B" is carried out as the second cycle. The pressure restoration characteristics of the respective pressure restoration processes F, F', . . . depend on the setting of the throttle valve 41' of the pressure restoration valve 41, therefore they are constant in respective thawing cycles, namely, the pressure restoration curve is constant in respective thawing cycles, thereby it is possible to carry out stable thawing.

As shown in FIG. 4, in the repetition of these thawing cycles, because the saturation steam pressure in the chamber 10 increases as the temperature of foodstuffs to be thawed increases, the reduced-pressures of the reduced-pressure balanced ranges B, B', B", . . . gradually increase as the repetition of the thawing cycles. Therefore, when the reduced-pressure in the reduced-pressure ranges B, B', B", . . . reaches a specified value, the thawing cycle is terminated. In other words, a desired thawing temperature is obtained by the range setting of saturation steam pressure, and when pressure restoration balance is achieved in this setting range, it is supposed that the desired thawing temperature has been achieved, and the thawing operation is terminated. Further, the number of thawing cycles repeated until this setting range varies with the mass of foodstuffs to be thawed, the output of the magnetron 22, the reduced-pressure capacity of the vacuum pump 46 and so forth, and in the preferred embodiment, the pressure value of P2A in FIG. 4 is set as 480 Pa (3.6 Torr), and the pressure value of P2B is set as 453 Pa (3.4 Torr), and when the reduced-pressure in the reduced-pressure balanced state B, B', B", . . . reaches a value between P2A and P2B, it is supposed that the temperature of foodstuffs to be thawed has become just minus 3 degrees Celsius, and the thawing cycle is terminated.

By the way, the setting pressure value of the P2A and P2B is the value obtained by adding 13.3 Pa (0.1 Torr) margin before and after the saturation steam pressure in the case of finish temperature set to minus 3 degrees Celsius, and this margin may be increased or decreased. Further, the finish temperature is not limited to minus 3 degrees Celsius, but it may be set to a desired temperature, and according to the saturation steam pressure corresponding to this setting temperature, the P2A and P2B are set.

In the controller 50, when the termination of thawing cycle is determined, the atmospheric release valve 40 is released, and the pump drive motor 45 is turned off and the vacuum pump 46 is terminated, and when the pressure of the vacuum sensor 31 shows 101.3 kPa (760 Torr), the door 11 may be opened, and foodstuffs to be thawed that are thawed to just minus 3 degrees Celsius may be taken out from the inside of the chamber 10.

By the way, in the chamber 10, in the case of occurrence of discharge phenomenon for some reason, the discharge sensor 30 detects such discharge by generation of UV ray, and the controller 50 forcibly terminates the magnetron 22 via the power control system 56, thereby possible damage on the internal wall and the like of the chamber 10 is prevented.

While, in order to thaw frozen foodstuffs under optimized conditions without deteriorating their eating quality and tastes, thawing conditions including the output of the microwave oscillator 22, irradiation time of microwaves, sublimation time and so forth per once thawing cycle vary a little with categories of foodstuffs to be thawed, for example, tune as a representative frozen fish meat and beef as a representative frozen animal meat, and also thawing conditions vary with shapes of foodstuffs to be thawed, for instance, whether foodstuffs to be thawed are blocks, strips, or thick pieces of beefsteak, or so on.

According to categories and shapes of foodstuffs to be thawed, thawing conditions may be entered at every thawing operation, while thawing conditions may be stored in advance into several courses according to categories and shapes of shapes of foodstuffs to be thawed, and thawing conditions according to foodstuffs to be thawed may be set by only selecting one of courses in thawing.

Therefore, in the next preferred embodiment, a case where thawing conditions are set according to objectives to be thawed is explained.

Figure 5:
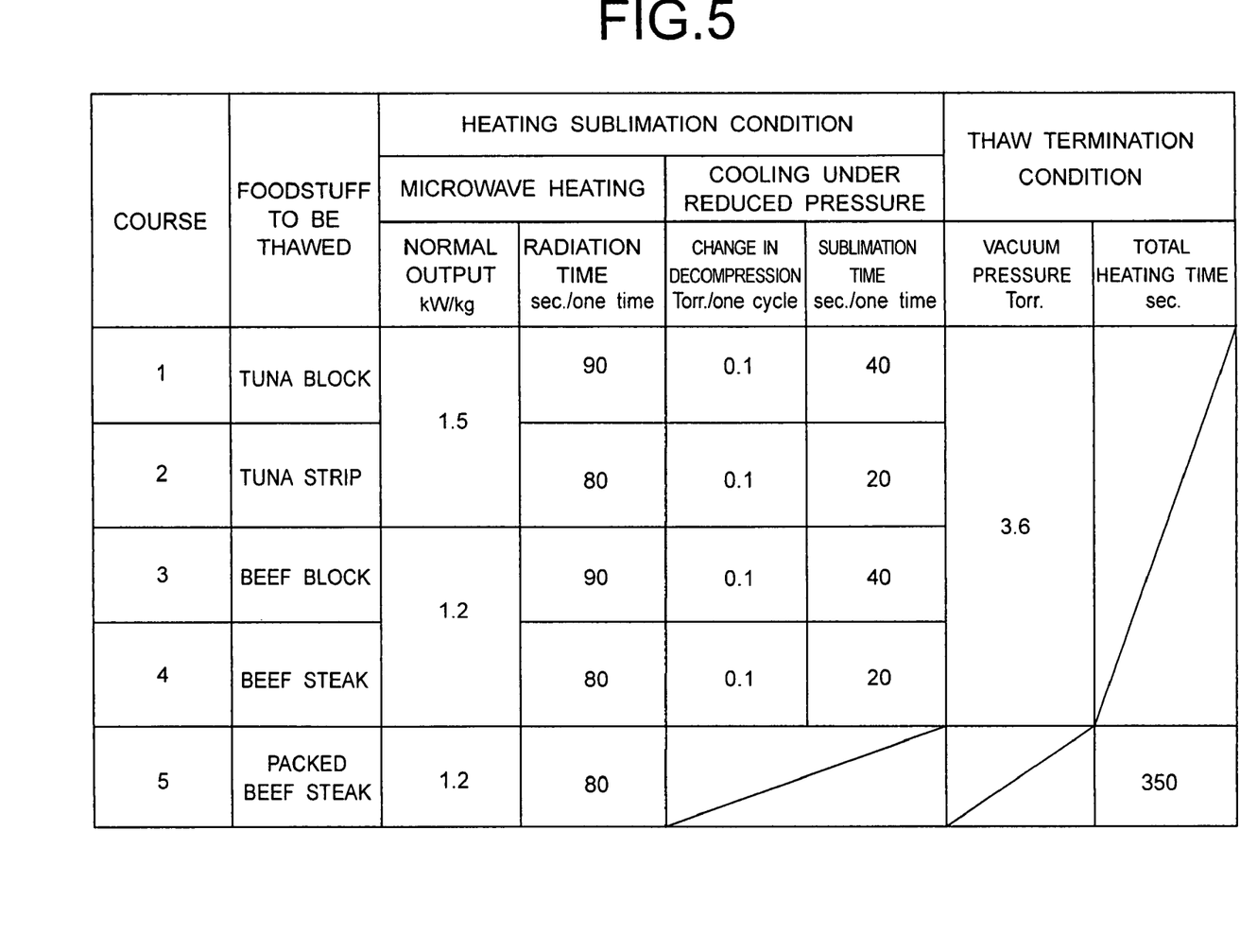
FIG. 5 is an explanatory table of different thawing conditions according to categories and shapes of frozen foods.

In the preferred embodiment shown in FIG. 5, tuna and beef are selectable among foodstuffs to be thawed, and even in the case of tuna, there are course 1 in the case of tuna blocks, and course 2 in the case of tuna strips are selectable, while in the case of beef, course 3 in the case of beef blocks, course 4 in the case of thick pieces of beefsteak, and course 5 in the case of thick pieces of beefsteak are selectable, as a result 5 courses in total are selectable.

Further, in the case of the course 1 to thaw tuna, various thawing conditions including the normal output of the microwave oscillator being 15 kW/kg, microwave irradiation time being 90 seconds for one thawing cycle, sublimation time being 40 seconds for one thawing cycle, and thawing termination conditions being 480 Pa (3.6 Torr) (minus 3 degrees Celsius) are stored into memory means (for example, ROMs) of the controller, and in the case of the course 2, various thawing conditions including the normal output of the microwave oscillator being 15 kW/kg, microwave irradiation time being 80 seconds for one thawing cycle, sublimation time being 20 seconds for one thawing cycle, and thawing termination conditions being 480 Pa (3.6 Torr) (minus 3 degrees Celsius) are stored in the same manners. In the similar manners, in the case of the course 3 to thaw beef, various thawing conditions including the normal output of the microwave oscillator being 12 kW/kg, microwave irradiation time being 90 seconds for one thawing cycle, sublimation time being 40 seconds for one thawing cycle, and thawing termination conditions being 480 Pa (3.6 Torr) (minus 3 degrees Celsius) are stored into memory means (for example, ROMs) of the controller, while in the case of the course 4, various thawing conditions including the normal output of the microwave oscillator being 12 kW/kg, microwave irradiation time being 80 seconds for one thawing cycle, sublimation time being 20 seconds for one thawing cycle, and thawing termination conditions being 480 Pa (3.6 Torr) (minus 3 degrees Celsius) are stored in the same manners.

In the case of beefsteak, various thawing conditions including the normal output of the microwave oscillator being 12 kW/kg, and microwave irradiation time being 80 seconds for one thawing cycle, but sublimation time and thawing termination conditions concerning reduced-pressure cooling are not stored, in the place thereof, the total heating time of microwave heating is stored as 350 seconds. As mentioned above, in the case of packed foodstuffs to be thawed, because control is not available by the saturation steam pressure in the chamber 10, the total time of heating to terminate at a desired thawing temperature is obtained experimentally. Based on the total time obtained, the total heating time is controlled so that thawing should be terminated at a desired temperature.

On the other hand, on the console panel, arranged are a course selection portion for selecting courses and a weight entry portion for entering the weight of foodstuffs to be thawed.

Accordingly, in thawing, a course is selected by operating the course selection portion of the console panel according to categories and shapes of foodstuffs to be thawed, and the weight of foodstuffs to be thawed is entered, then the controller repeats thawing cycles according to appropriate thawing conditions in the thawing operation concerned, and finishes the operation at the desired thawing temperature.

By the way, in order to regulate the normal output of the microwave oscillator 22, the duty percent of the maximum output may be changed.

Figure 6:
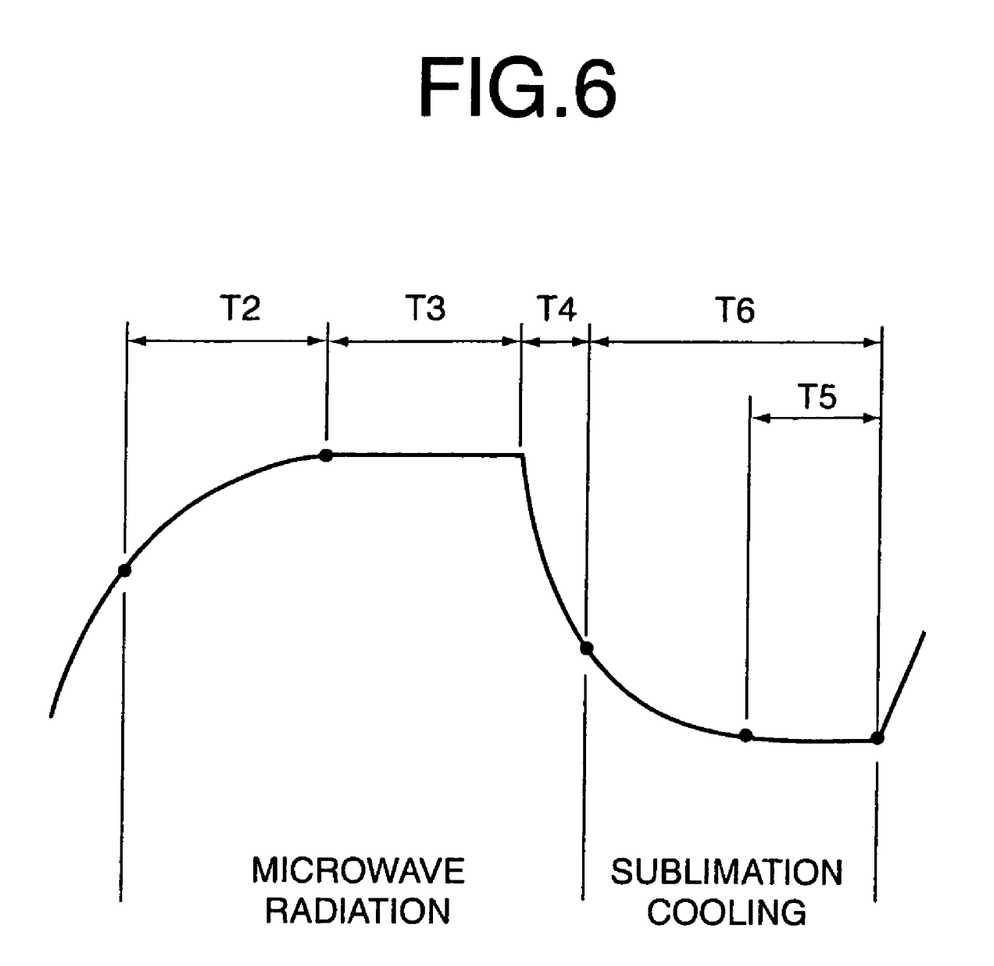
FIG. 6 is an enlarged diagram of part of a thawing cycle for explaining the method to adjust irradiation time of microwaves and sublimation cooling time.

In order to adjust the microwave irradiation time, as shown in FIG. 6, the time from irradiation start to pressure restoration upper limit is set as T2, the time from reaching pressure restoration upper limit to closing the pressure regulation valve 41 is set as T3, the tome from expiration of time set to T3 to irradiation termination is set as T4, and the T3 may be increased or decreased. Namely, at the moment shifting from pressure restoration process to reduced-pressure process, pressure restoration status maintaining process may be inserted. This is because, if the pressure regulation valve 41 is left opened after the pressure restoration upper limit is reached, the leakage from the pressure regulation valve 41 and the suction capacity of the vacuum pump 46 become balanced with each other and the vacuum pressure in the chamber 10 is maintained, and it is possible to continue microwave irradiation as long as necessary without any trouble.

Further, in order to adjust sublimation time, from the same idea, after sublimation cooling is started and reduced-pressure balanced range is reached, reduced-pressure balanced maintaining process (time T5) is inserted, and by increasing or decreasing this time T5, it is possible to adjust sublimation cooling time T6 per one thawing cycle. This is because, if the pressure regulation valve 41 is left closed after the reduced-pressure upper limit is reached, the saturation steam pressure and the suction capacity of the vacuum pump 46 become balanced with each other and the vacuum pressure in the chamber 10 is maintained, and it is possible to continue sublimation cooling of the surface of foodstuffs to be thawed as long as necessary without any trouble.

As mentioned above, when courses are selectable according to foodstuffs to be thawed, it is possible to eliminate operation to entry category, shape, and weight at respective thawing operations, thereby to simplify thawing procedures.

By the way, in the preferred embodiments, foodstuffs to be thawed are explained as frozen foods, however, in the present invention, foodstuffs to be thawed are not limited to foods, but may be blood, blood serum, semen, medicines, and so forth.

INDUSTRIAL APPLICABILITY

As is apparent from the, a vacuum microwave thawing method and a vacuum microwave thawing machine according to the present invention may be available not only in food industrial field but also wide fields including medical industrial field.

The invention claimed is:

1. A vacuum microwave thawing method for heating and thawing frozen foodstuffs by repeating a reduced-pressure process and a pressure restoration process and radiating microwaves, said method comprising:
   after the reduced-pressure process is carried out to a reduced-pressure balanced range, initiating the pressure restoration process for a thawing cycle, the thawina cycle comprising:

(a) after the reduced-pressure of the pressure restoration process reaches a lower limit at which vacuum discharge does not occur, initiating irradiation of microwaves,
(b) after pressure restoration is carried out to a preset pressure restoration upper limit, repeating the reduced-pressure process,
(c) repeating the irradiation of microwaves until the reduced-pressure reaches the lower limit at which vacuum discharge does not occur, and
(d) performing sublimation cooling in the reduced-pressure process to the reduced-pressure balanced range, after the irradiation of microwaves is terminated; and repeating the thawing cycle, until a desired thawing temperature is reached.

2. A vacuum microwave thawing method according to claim 1, wherein the reduced-pressure of the reduced-pressure balanced range gradually increases as the thawing cycle is repeated, and when the reduced-pressure reaches a specified value, the thawing cycle is terminated.

3. A vacuum microwave thawing method according to claim 1, wherein the lower limit of the reduced-pressure at which the vacuum discharge does not occur is 1.33 kPa (10 Torr).

4. A vacuum microwave thawing method according to claim 1, wherein the pressure restoration upper limit is set by the output of a microwave oscillator for radiating microwaves and the reduced-pressure capacity of a vacuum pump.

5. A vacuum microwave thawing method according to claim 1, wherein pressure restoration characteristics in the pressure restoration process are constant in each thawing cycle.

6. A vacuum microwave thawing method according to claim 1, wherein an appropriate output of a microwave oscillator, microwave irradiation time per thawing cycle, and sublimation time are prerecorded into a controller as several courses according to categories and shapes of foodstuffs to be thawed, the courses being selectable in thawing, and according to the thawing conditions of a selected course, the controller controlling the thawing cycle and carrying out the thawing.

7. A vacuum microwave thawing machine for heating and thawing frozen foodstuffs by repeating a reduced-pressure process and a pressure restoration process and radiating microwaves, said machine comprising:
a chamber for storing foodstuffs to be thawed;
a vacuum pump for decompressing the inside of the chamber;
a regulation valve for recompressing the inside of the chamber;
a microwave oscillator for radiating microwaves into the chamber; and
a controller configured to control control systems of the vacuum pump, regulation valve and microwave oscillator to:
initiate a pressure restoration process, after a reduced-pressure process is carried out to a reduced-pressure balanced range, for a thawing cycle, said thawing cycle being controlled by the controller to repeat until a desired thawing temperature is reached and said thawing cycle comprising:
initiating irradiation with microwaves, after the reduced-pressure of the pressure restoration process reaches a lower limit, at which vacuum discharge does not occur,
repeating the reduced-pressure process, after the pressure restoration process is carried out to a preset pressure restoration upper limit,
repeating the irradiation with microwaves until the reduced-pressure reaches the lower limit at which vacuum discharge does not occur, and a
performing a sublimation cooling process in the reduced-pressure process to the reduced-pressure balanced range, after the the irradiation with microwaves is terminated.

8. A vacuum microwave thawing machine according to claim 7, wherein the reduced-pressure of the reduced-pressure balanced range is preset to gradually increase as the thawing cycle is repeated, and when the reduced-pressure reaches a specified value, the thawing cycle is terminated.

9. A vacuum microwave thawing machine according to claim 7, wherein the lower limit of the reduced-pressure, at which the vacuum discharge does not occur, is preset to 1.33 kPa (10 Torr).

10. A vacuum microwave thawing machine according to claim 7, wherein the pressure restoration upper limit is set by the output of a microwave oscillator for radiating microwaves and the reduced-pressure capacity of a vacuum pump.

11. A vacuum microwave thawing machine according to claim 7, wherein pressure restoration characteristics in the pressure restoration process are constant in each thawing cycle.

12. A vacuum microwave thawing machine according to claim 7, wherein a discharge sensor for detecting occurrence of discharge in the chamber is arranged, and the discharge sensor is connected to the controller to forcibly terminate the actions of the microwave oscillator.

13. A vacuum microwave thawing machine according to claim 7, wherein the controller is equipped with memory means for storing in advance an appropriate output of a microwave oscillator, microwave irradiation time per thawing cycle, and sublimation time, as several courses according to categories and shapes of foodstuffs to be thawed, and a course selection portion for selecting the courses is arranged, and according to the thawing conditions of a course selected by the operation at the course selection portion, the controller controlling the thawing cycle and carrying out the thawing.

* * * * *